United States Patent
Krishnamoorthy et al.

(10) Patent No.: US 10,021,711 B2
(45) Date of Patent: Jul. 10, 2018

(54) METHODS AND APPARATUS FOR REDUCING RESOURCE CONTENTION

(71) Applicant: QUALCOMM Incorporated, San Diego, CA (US)

(72) Inventors: Parthasarathy Krishnamoorthy, Hyderabad, CA (US); Vinesh Kisan Kaviskar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/078,976

(22) Filed: Mar. 23, 2016

(65) Prior Publication Data

US 2017/0280473 A1    Sep. 28, 2017

(51) Int. Cl.
*H04W 72/12* (2009.01)
*H04W 52/02* (2009.01)
(Continued)

(52) U.S. Cl.
CPC ... *H04W 72/1231* (2013.01); *H04W 52/0216* (2013.01); *H04W 76/28* (2018.02); *H04W 52/0277* (2013.01); *H04W 68/12* (2013.01); *H04W 84/042* (2013.01); *H04W 88/06* (2013.01); *Y02D 70/00* (2018.01);
(Continued)

(58) Field of Classification Search
CPC ......... H04W 72/1231; H04W 52/0216; H04W 76/048; H04W 88/06; H04W 68/12; H04W 84/042; H04W 52/0277; Y02B 60/50
See application file for complete search history.

(56) References Cited

U.S. PATENT DOCUMENTS 9,066,240 B2    6/2015   Sadek et al.
9,232,555 B2    1/2016   Su
(Continued)

OTHER PUBLICATIONS

"3rd Generation Partnership Project; Technical Specification Group Services and System Aspects; Study on system impacts of extended Discontinuous Reception (DRX) cycle for power consumption optimization (Release 13)", 3GPP Standard; 3GPP TR 23.770, 3rd Generation Partnership Project (3GPP), Mobile Competence Centre ; 650, Route Des Lucioles ; F-06921 Sophia-Antipolis Cedex ; France, vol. SA WG2, No. V13.0.0, Sep. 21, 2015 (Sep. 21, 2015), pp. 1-42, XP050996025, [retrieved on Sep. 21, 2015].
(Continued)

*Primary Examiner* — Thai Nguyen
(74) *Attorney, Agent, or Firm* — Patterson & Sheridan, LLP

(57) ABSTRACT

Certain aspects of the present disclosure relate to methods and apparatus for reducing resource contention between two or more RATs supported by a User Equipment (UE). The UE may determine a first level of contention between Radio Frequency (RF) resources to be used by two or more Radio Access Technologies (RATs) supported by the UE over a given period of time for performing at least one type of receive activity, based at least on assigned Discontinuous Reception (DRX) cycles for the RATs. The UE may decide to initiate an update of a DRX cycle for at least one of the RATs to reduce the contention, at least if the determined first level is greater than a given threshold level of the contention over the given period of time.

30 Claims, 9 Drawing Sheets

(51) Int. Cl.
*H04W 76/28* (2018.01)
*H04W 84/04* (2009.01)
*H04W 68/12* (2009.01)
*H04W 88/06* (2009.01)

(52) U.S. Cl.
CPC ........ *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/24* (2018.01)

(56) References Cited

U.S. PATENT DOCUMENTS

| | | |
|---|---|---|
| 2008/0232310 A1 | 9/2008 | Xu |
| 2011/0211466 A1 | 9/2011 | Kazmi |
| 2012/0207069 A1 | 8/2012 | Xu et al. |
| 2013/0083712 A1* | 4/2013 | Sadek ............... H04W 16/14 370/311 |
| 2014/0073312 A1* | 3/2014 | Su ..................... H04B 1/0067 455/419 |
| 2014/0119255 A1 | 5/2014 | Vannithamby et al. |

OTHER PUBLICATIONS

International Search Report and Written Opinion—PCT/US2017/021680—ISA/EPO—dated Jun. 30, 2017.

* cited by examiner

METHODS AND APPARATUS FOR REDUCING RESOURCE CONTENTION

FIELD

The present disclosure relates generally to wireless communication, and more particularly, to methods and apparatus for reducing resource contention in devices supporting multiple Radio Access Technologies (RATs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication by a User Equipment (UE). The method generally includes determining a first level of contention between Radio Frequency (RF) resources to be used by two or more Radio Access Technologies (RATs) supported by the UE over a given period of time for performing at least one type of receive activity, based at least on assigned Discontinuous Reception (DRX) cycles for the RATs, and deciding to initiate, by the UE, an update of a DRX cycle for at least one of the RATs to reduce the contention, at least if the determined first level is greater than a given threshold level of the contention over the given period of time.

Certain aspects of the present disclosure provide an apparatus for wireless communication by a UE. The apparatus generally includes means for determining a first level of contention between Radio Frequency (RF) resources to be used by two or more Radio Access Technologies (RATs) supported by the UE over a given period of time for performing at least one type of receive activity, based at least on assigned Discontinuous Reception (DRX) cycles for the RATs, and means for deciding to initiate an update of a DRX cycle for at least one of the RATs to reduce the contention, at least if the determined first level is greater than a given threshold level of the contention over the given period of time.

Certain aspects of the present disclosure provide an apparatus for wireless communication by a UE. The apparatus generally includes at least one processor and a memory coupled to the at least one processor. The at least one processor is generally configured to determine a first level of contention between Radio Frequency (RF) resources to be used by two or more Radio Access Technologies (RATs) supported by the UE over a given period of time for performing at least one type of receive activity, based at least on assigned Discontinuous Reception (DRX) cycles for the RATs, and decide to initiate an update of a DRX cycle for at least one of the RATs to reduce the contention, at least if the determined first level is greater than a given threshold level of the contention over the given period of time.

Certain aspects of the present disclosure provide a computer readable medium comprising software code which when executed by a computer performs a method comprising determining a first level of contention between Radio Frequency (RF) resources to be used by two or more Radio Access Technologies (RATs) supported by the UE over a given period of time for performing at least one type of receive activity, based at least on assigned Discontinuous Reception (DRX) cycles for the RATs, and deciding to initiate, by the UE, an update of a DRX cycle for at least one of the RATs to reduce the contention, at least if the determined first level is greater than a given threshold level of the contention over the given period of time.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

DETAILED DESCRIPTION

Figure 1:
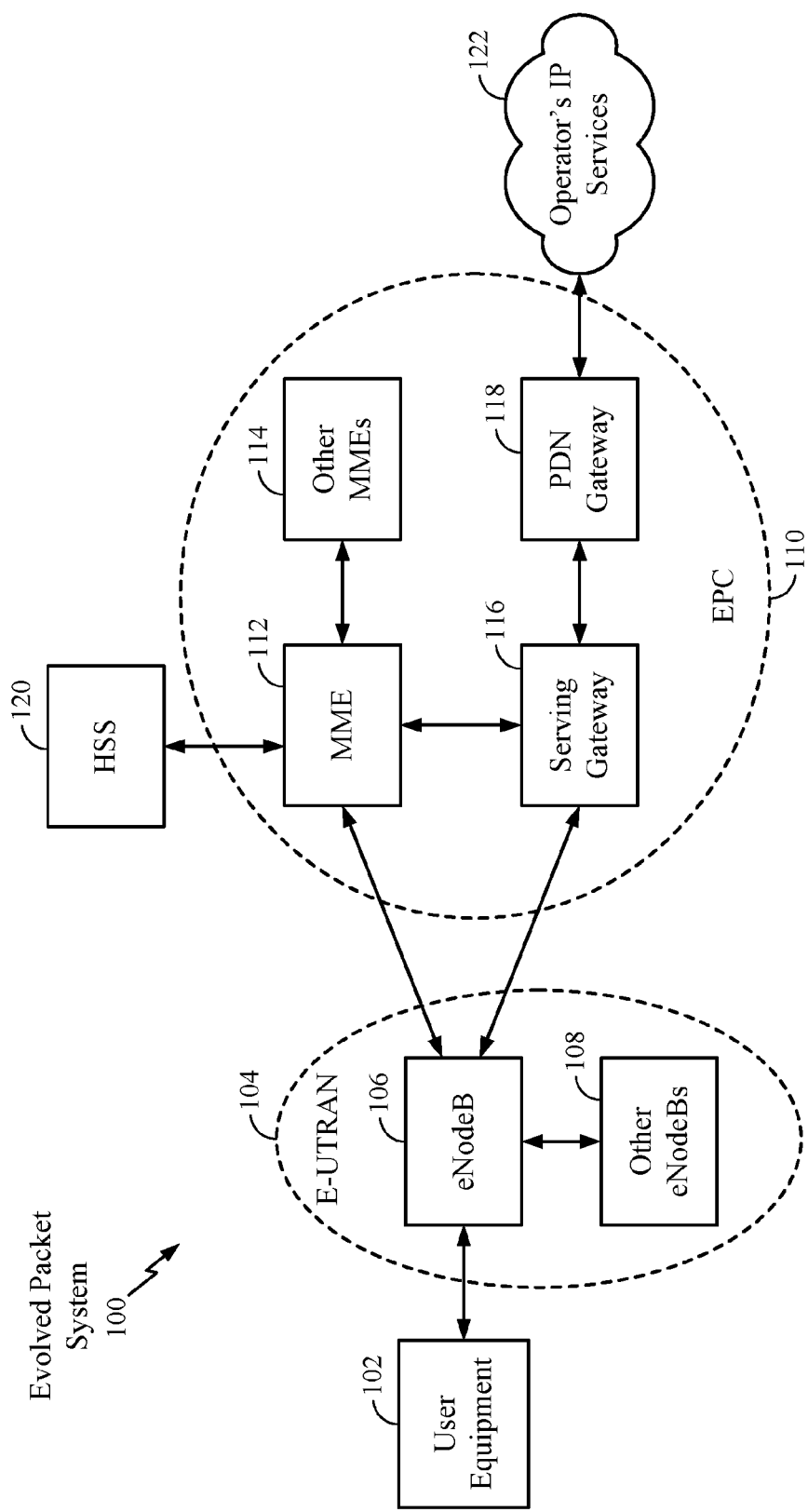
FIG. 1 is a diagram illustrating an example of a network architecture.

Certain devices (e.g., UE) support multiple Radio Access Technologies (RATs) and are capable of communicating in those multiple RATs. The different RATs supported by a device may include a combination of LTE and other RATs including GSM, CDMA, or 1x. The multiple supported RATs may also include two different LTE networks. Generally, a multi-RAT device may need to perform certain types of receive activities for each of the supported RATs. These receive activities may include, but are not limited to, page reception, overhead information (e.g., signaling overhead) collection, receiving signaling for neighbor measurement, system information collection, or receiving signaling connected to cell selection/reselection. In certain aspects, when a UE is in an idle mode (e.g., RRC idle mode), the UE may be configured to perform one or more of the receive activities for each RAT in receive opportunities (or occasions) configured for the RAT. In an aspect, these receive opportunities for performing one or more of the receive activities in a RAT may be based on a DRX (Discontinuous Reception) cycle being used for the RAT.

In certain aspects, a device (e.g., UE) may have to share a receive chain between multiple RATs. For example, a Dual SIM device may include only one transceiver and/or corresponding RF chain for use by the two RATs supported by the Dual SIM device. In certain aspects, the sharing of an RF chain may lead to RF chain/resource contention between the supported RATs. For example, paging opportunities for two or more RATs may overlap leading to RF chain/resource contention between the RATs.

In certain aspects of the present disclosure, default DRX cycles of one or more RATs supported by a UE are changed intelligently to UE specific DRX cycles to reduce or avoid receive opportunities (e.g., paging occasions) of the RATs from overlapping. In certain aspects, the UE (e.g., a protocol entity of the UE) calculates a probable level (e.g., percentage) of resource contention 'C' between two or more supported RATs over a given period of time 'T' based on the cell specific default DRX cycles assigned by the network. In certain aspects, if the determined contention percentage C is higher than a predefined threshold percentage of contention S (e.g., C>S), the UE decides to initiate a new UE specific DRX cycle for one or more of the supported RATs to reduce or avoid the resource contention. In an aspect, changing the DRX cycles of the one or more RATs changes the position of paging occasions of those RATs, and the changed paging occasions of those RATs may not overlap (or at least overlap to a lesser degree) with paging occasions of other RATs, thus reducing or avoiding resource contention between the RATs.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, a receiving device (e.g., UE 102) determines a first level of contention between RF resources to be used by two or more RATs supported by the UE over a given period of time for performing at least one type of receive activity, based at least one assigned DRX cycles for the RATs. The UE decides to initiate an update of a DRX cycle for at least one of the RATs to reduce the contention, at least if the determined first level is greater than a given threshold level of the contention over the given period of time.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
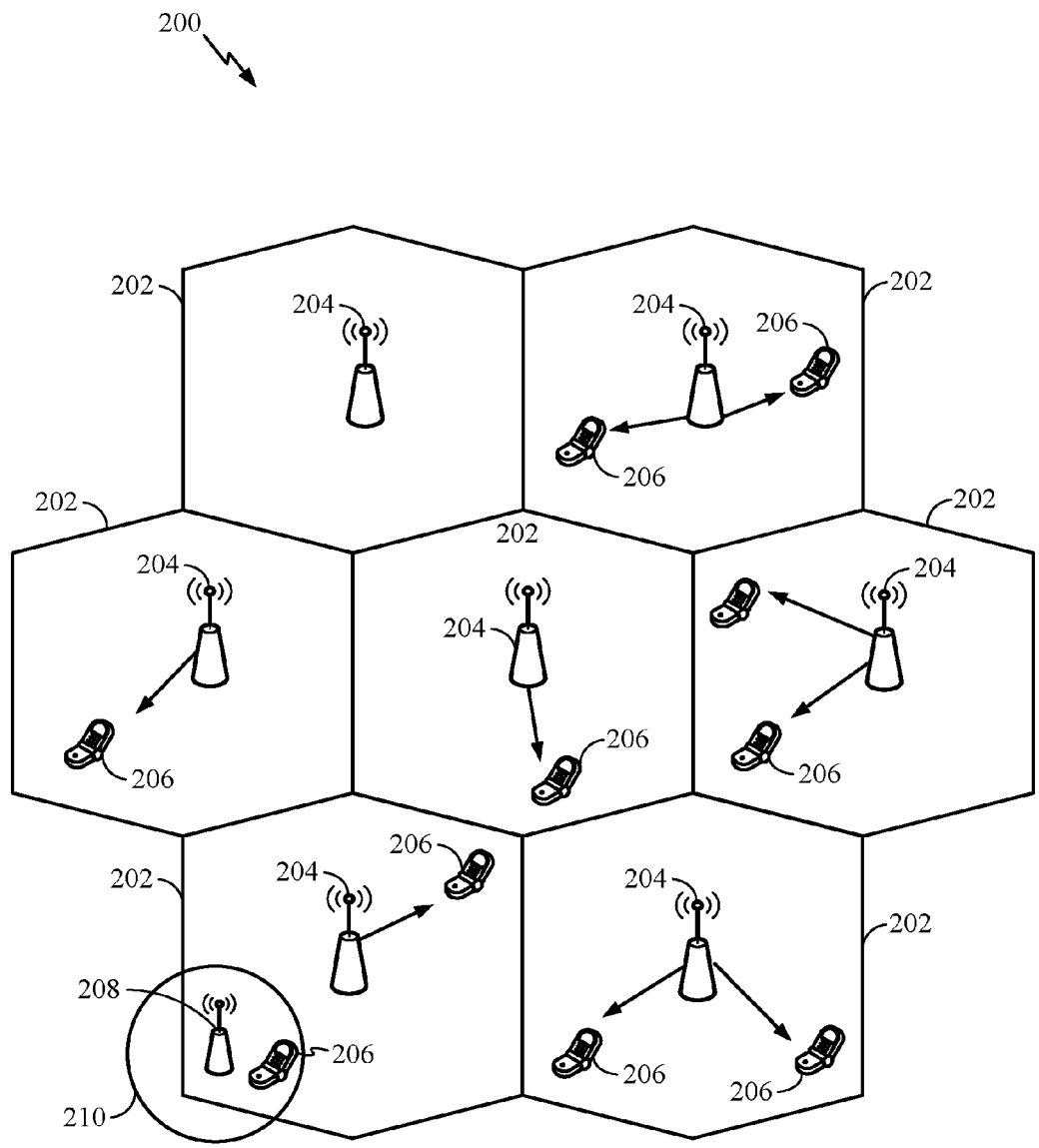
FIG. 2 is a diagram illustrating an example of an access network.

FIG. 2 is a diagram illustrating an example of an access network 200 in an LTE network architecture in which aspects of the present disclosure may be practiced. For example, UEs 206 may be configured to implement techniques for reducing RF resource contention between RATs supported by the UE, in accordance with certain aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
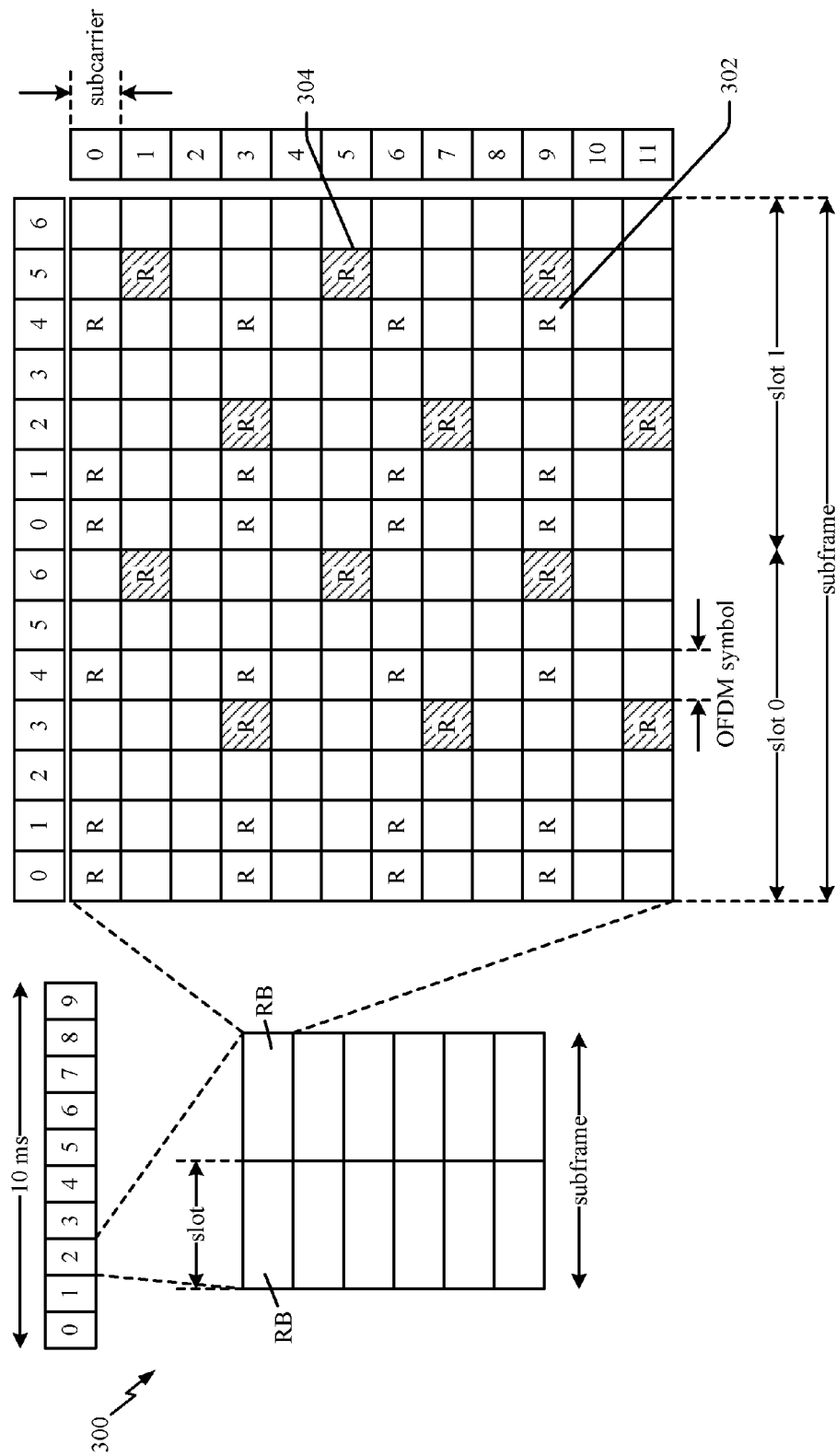
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
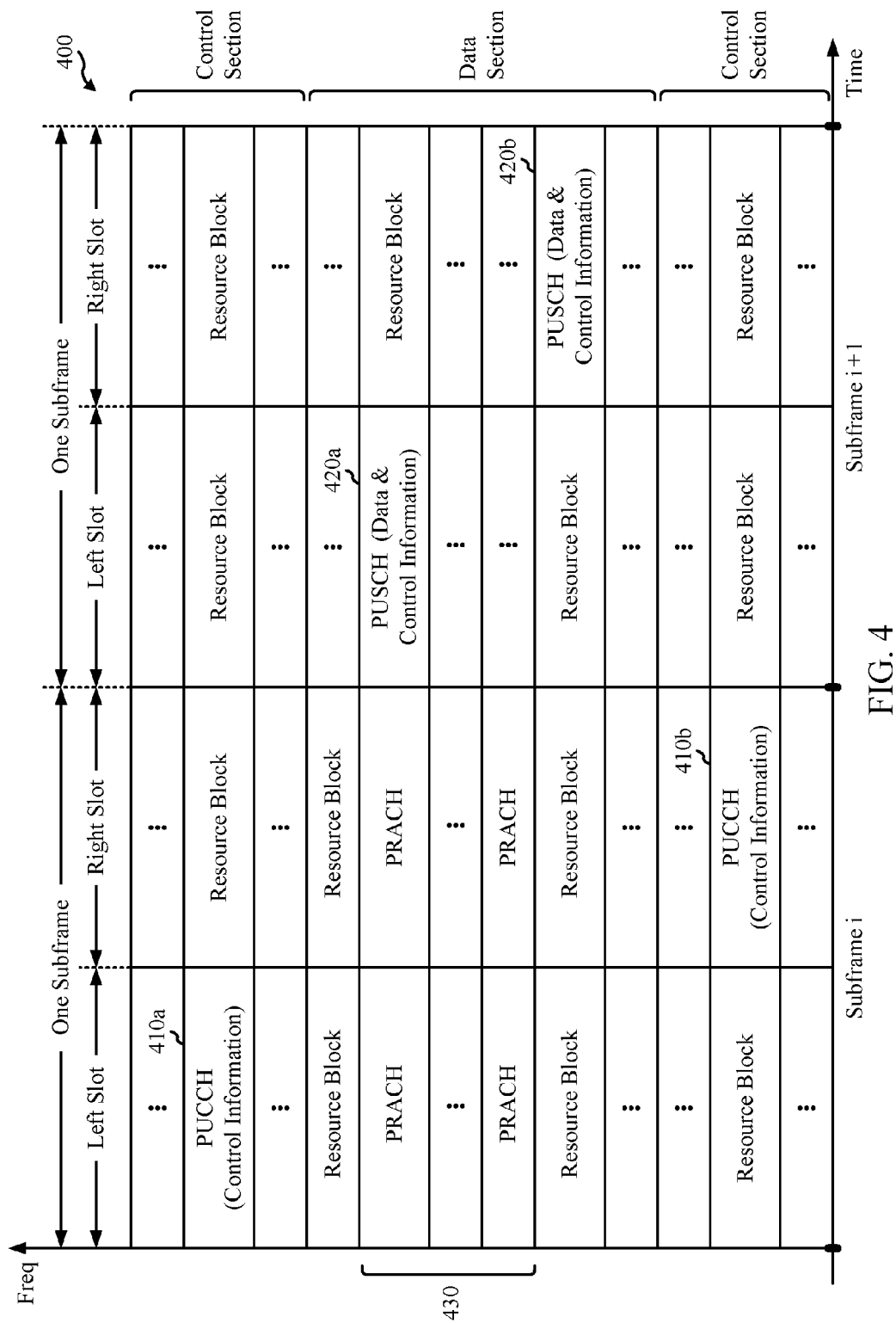
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
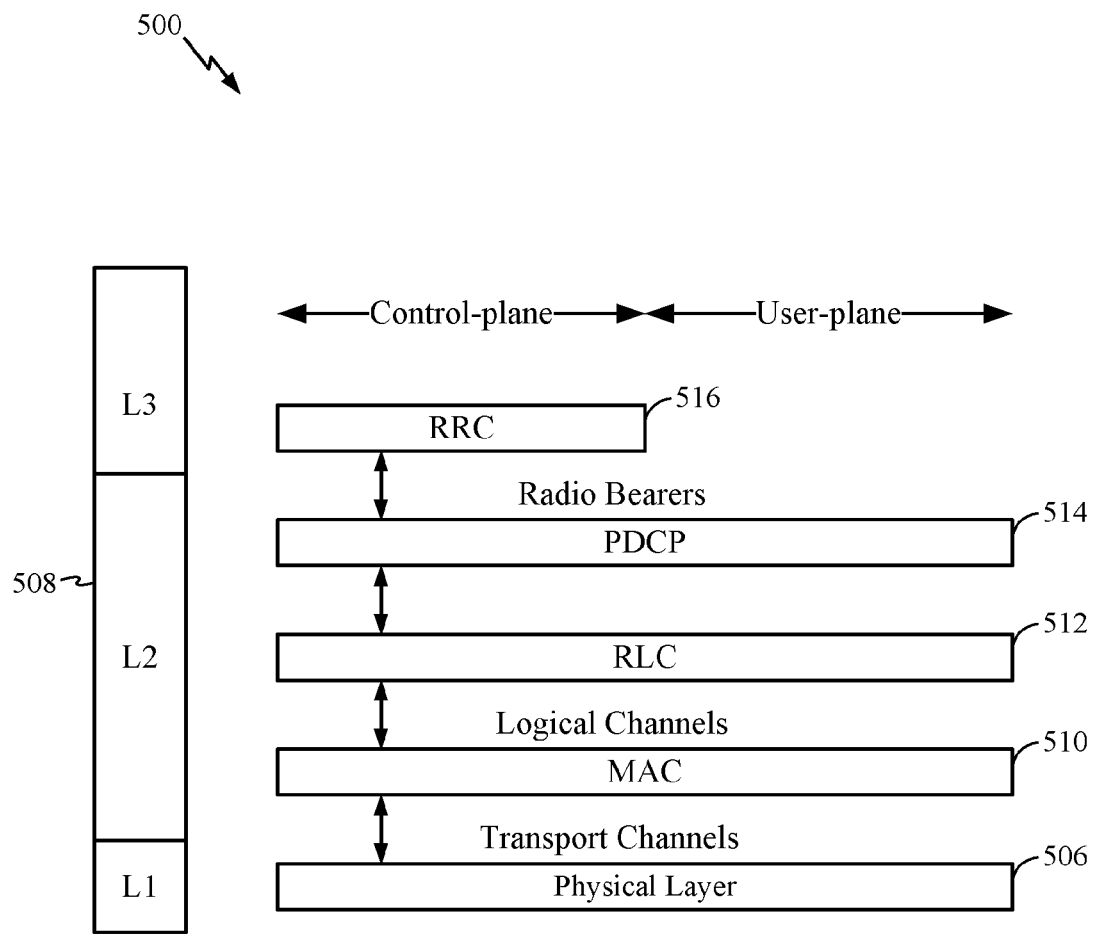
FIG. 5 is a diagram illustrating an example of a radio protocol architecture for the user and control plane.

FIG. 5 is a diagram 500 illustrating an example of a radio protocol architecture for the user and control planes in LTE.

The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
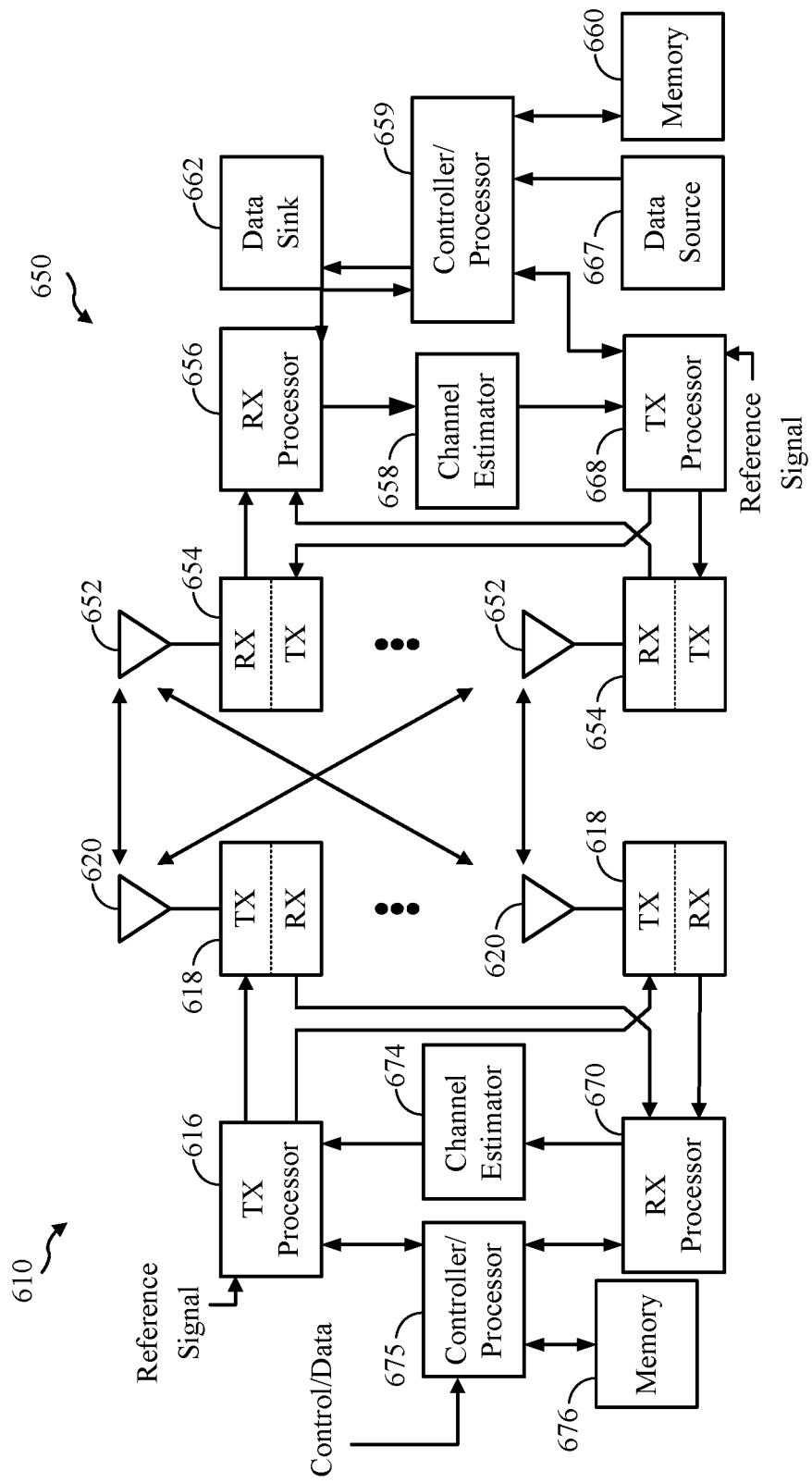
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

For example, a receiving device (e.g., UE 650) determines a first level of contention between RF resources to be used by two or more RATs supported by the UE over a given period of time for performing at least one type of receive activity, based at least one assigned DRX cycles for the RATs. The UE 650 decides to initiate an update of a DRX cycle for at least one of the RATs to reduce the contention, at least if the determined first level is greater than a given threshold level of the contention over the given period of time It may be noted that the UE 650 noted above for implementing the techniques for reducing resource contention in multi-RAT UEs in accordance with certain aspects of the present disclosure may be implemented by a combination of one or more of the controller/processor 659, the RX processor 656, the TX processor 668, the memory 660, and the transceiver 654 at the UE 650.

In the DL, upper layer packets from the core network are provided to a controller/processor 675. The controller/processor 675 implements the functionality of the L2 layer, for example. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer), for example. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer, for example. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer, for example. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659, for example. The data source 667 represents all protocol layers above the L2 layer, for example. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610, for example. The controller/processor 659 is also responsible for HARQ operations, retransmission of lost packets, and signaling to the eNB 610, for example.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer, for example.

The controller/processor 675 implements the L2 layer, for example. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 7:
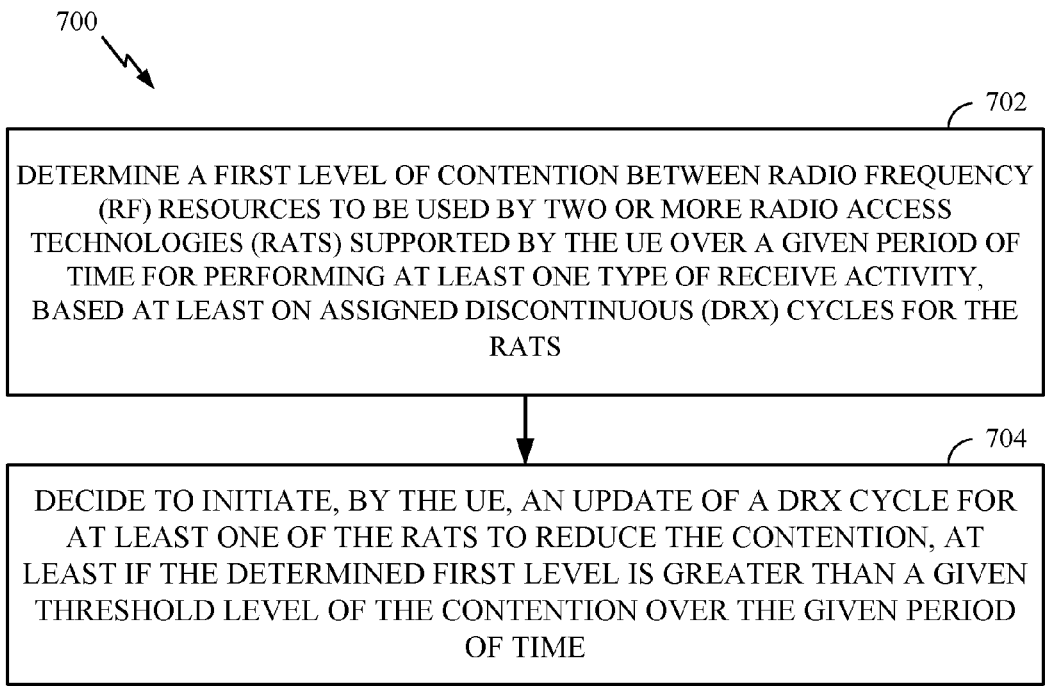
FIG. 7 illustrates example operations 800, performed by a UE, for reducing resource contention between supported RATs, in accordance with certain aspects of the present disclosure.

The controller/processor 659 and/or other processors, components and/or modules at the UE 650 may perform or direct operations, for example, operations 700 and 800 in FIGS. 7 and 8 respectively, and/or other processes for the techniques described herein for reducing resource contention between RATs supported by a the UE. In certain aspects, one or more of any of the components shown in FIG. 6 may be employed to perform example operations 700 and 800, and/or other processes for the techniques described herein. The memories 660 and 676 may store data and program codes for the UE 650 and eNB 610 respectively, accessible and executable by one or more other components of the UE 650 and the eNB 610.

Example Techniques for Reducing Resource Contention in Devices Supporting Multiple Radio Access Technologies (Rats)

Certain devices support multiple Radio Access Technologies (RATs) and are capable of communicating in those multiple RATs. For example, a UE may be configured with dual SIM (Subscriber Identity Module) capability for Dual SIM Dual Standby (DSDS) operation. In such an aspect, the UE may include two SIM adapters to hold two SIM cards. Dual SIM operation generally allows for use of two or more radio access technologies (RATs) where access to each RAT is based on a different SIM card. Thus, Dual SIM operation may allow use of two services (or operator networks) operating on different radio frequency (RF) channels by a single UE. In another aspect, a single SIM device may also be configured to communicate on different channels of different RATs. In an aspect, such devices may be referred to as multi-RAT devices The different RATs supported by a device may include a combination of LTE and other RATs including GSM, CDMA, or 1×. The multiple supported RATs may also include two different LTE networks. Generally, a multi-RAT device may need to perform certain types of receive activities for each of the supported RATs. These receive activities may include, but are not limited to, page reception, overhead information (e.g., signaling overhead) collection, receiving signaling for neighbor measurement, system information collection, or receiving signaling connected to cell selection/reselection. In certain aspects, when a UE is in an idle mode (e.g., RRC idle mode), the UE may be configured to perform one or more of the receive activities for each RAT in receive opportunities (or occasions) configured for the RAT. In an aspect, these receive opportunities for performing one or more of the receive activities in a RAT may be based on a DRX (Discontinuous Reception) cycle being used for the RAT.

A DRX cycle generally includes a certain number of radio frames in each cycle. A UE is generally assigned a particular receive opportunity (e.g., subframe within a frame) within each DRX cycle to perform a receive activity.

For example, one of the important receive activities performed by a UE during idle mode is listening to and receiving paging messages. The UE, for example, needs to listen to paging messages to know about incoming calls, system information change, or emergency notifications. Paging messages may be triggered by MME in core network or eNB in Radio Access Network. UEs in idle mode monitor the PDCCH for pages (e.g., Paging RNTI, P-RNTI) received from an eNB. The UE needs to monitor the PDCCH only at certain UE specific (and RAT specific if supporting multiple RATs) paging occasions, for example, at a specific subframe in a specific radio frame. At other times, the UE may generally power down to save battery power. In certain aspects, a paging frame is one radio frame in which the UE may look for a paging message, one paging frame generally including multiple paging occasions. A paging occasion is generally a subframe carrying a paging message for the UE (or a particular RAT supported by the UE). In an aspect, there is always one paging occasion for each UE in a DRX cycle.

A DRX cycle generally indicates the number of radio frames in a paging cycle. Larger the DRX cycle, lesser the UE battery power consumption. Whereas smaller the value of the DRX cycle, greater is the UE battery power consumption. A DRX cycle may be cell specific or UE specific parameter. DRX cycle is cell specific when it is configured at eNB and signaled to all UEs in a cell as part of system information (e.g., in SIB2) as "default DRX or paging cycle." DRX cycle is UE specific when MME configures the DRX cycle and provides it to a UE in NAS signaling as "UE specific DRX cycle" and to the eNB as a PAGING S1 AP message as 'Paging DRX' for MME initiated paging message.

A device (e.g., UE) generally needs to receive pages for each supported RAT for synchronized communication with the respective network. Generally, when a multi-RAT device is in an idle mode (or standby mode), the device has to wake up periodically to listen to pages in each of the supported RATs, for example, based on the DRX (Discontinuous Reception) cycle being used for the RAT. For LTE, the device may need to wake up both in idle and CDRx (connected Discontinuous Reception mode), for example during network/RRC mismatch states which may occur after a long tune away to other RATs. The paging opportunities for each RAT depend on the DRX cycle being used for the RAT.

In certain aspects, to save costs, a device (e.g., UE) may have to share a receive chain between multiple RATs. For example, a Dual SIM device may include only one transceiver and/or corresponding RF chain for use by the two RATs supported by the Dual SIM device. In certain aspects, the sharing of an RF chain may lead to RF chain/resource contention between the supported RATs. For example, paging opportunities for two or more RATs may overlap leading to RF chain/resource contention between the RATs.

In an aspect, even though a PBR (Page Blocking Rate) mechanism exists to handle paging occasion collisions in multi-SIM devices, it is still not efficient for various reasons and the issues arising out of RF resource contentions are frequently encountered. For example, in the event of an RF chain/resource contention, for example, due to a paging occasion overlap between two RATs, the internal resource manager modules present in the UE honor the RF chain requests for each RAT based on a prior history of chain grants and/or denials for the RAT. For example, if the RF resources were given to one RAT during a previous collision, the RF resources may be given to a second different RAT during a current collision. Thus, in the even of a RF chain/resource contention, only one RAT wins the resources while all other RATs loose. In other words, the existing mechanisms for handling RF chain/resource contention work on the concept of "win-lose negotiation" between the RATs contending for the resources, which makes it quite inefficient. Further, the eNB is generally not aware of these contention handling mechanisms at the UE, and continues to transmit pages for the RATs as scheduled. However, the pages are only received by the winning RAT, and the page transmissions for the losing RATs are wasted.

In an aspect, a losing RAT may have a chance to receive a missed page again in consecutive paging occasions via page repetition support provided by the network. However, this increases signaling load on the network and not appreciated by network operators. Further, channel conditions may worsen between paging occasions, and thus, the UE may or may not successfully receive a repeat transmission of the page, even if page repetition is supported by the network.

Hence RF resource contentions may severely hamper device performance. For example, in LTE CSFB (Circuit Switched Fall Back) multi-SIM devices, missed pages may force the UE to fall back to native 1x/GSM to receive voice calls.

Aspects of the present disclosure discuss efficient techniques for managing RF chain/resource contentions while performing one or more receive activities for multi-RAT devices, that reduce the RF contentions and improve receive performances (e.g., paging performance) of the supported RATs, hence improving overall device performance. By reducing or completely avoiding RF contentions, the discussed techniques work on a win-win concept as compared to win-lose negotiation between RATs as provided by existing mechanisms.

In certain aspects of the present disclosure, default DRX cycles of one or more RATs supported by a UE are changed intelligently to UE specific DRX cycles to reduce or avoid receive opportunities (e.g., paging occasions) of the RATs from overlapping. In certain aspects, the UE (e.g., a protocol entity of the UE) calculates a probable level (e.g., percentage) of resource contention between two or more supported RATs over a given period of time based on the cell specific default DRX cycles assigned by the network. In an aspect, the UE generally receives information from the network regarding receive opportunities that the UE needs to monitor to perform one or more receive activities. For example, the UE generally receives information regarding paging frames and paging occasions as part of DRX parameters broadcasted in the system information block SIB2. Thus, for each RAT, the internal software modules (e.g., resource manager modules) of the UE know information regarding when, how often, and for what purpose a RAT requests RF resources including, for example, information regarding default DRX cycles and paging occasions. So, based on the available information, the device has the capability to predict upcoming resource contentions.

In an aspect, based on the available information including default DRX cycles and corresponding paging occasions for each supported RAT, a UE determines a probable percentage of RF resource contention C for the supported RATs over an upcoming time period T. In certain aspects, if the determined contention percentage C is higher than a predefined threshold percentage of contention S (e.g., C>S), the UE decides to initiate a new UE specific DRX cycle for one or more of the supported RATs to reduce or avoid the resource contention. In an aspect, changing the DRX cycles of the one or more RATs changes the position of paging occasions of those RATs, and the changed paging occasions of those RATs may not overlap (or at least overlap to a lesser degree) with paging occasions of other RATs, thus reducing or avoiding resource contention between the RATs. In an aspect, the threshold percentage of contention S is a configurable parameter.

FIG. 7 illustrates example operations 800, performed by a UE, for reducing resource contention between supported RATs, in accordance with certain aspects of the present disclosure. Operations 700 being, at 702, by determining a first level (e.g., percentage) of contention between RF resources to be used by two or more RATs supported by the UE over a given period of time for performing at least one type of receive activity (e.g., page reception), based at least one assigned DRX cycles for the RATs. At 704, the UE decides to initiate, an update of DRX cycle for at least one of the RATs to reduce the contention, at least if the determined first level is greater than a given threshold level of the contention over the given period of time.

In certain aspects, the idle mode DRX cycle values supported for LTE are 32, 64, 128, and 256 radio frames, which correspond to 320 ms, 640 ms, 1280 ms and 2560 ms respectively. For example, a DRX cycle value of 32 radio frames means that the UE needs to wake up every 32 radio frames or 320 ms to listen to paging messages. Thus, for example, assuming that the UE initially operates at a default DRX cycle of 1280 ms, and when it determines that the contention percentage C over time T based on the default DRX cycle is higher than the threshold contention percentage S, the UE may decide to initiate the next available lower DRX cycle, which is 640 ms. While the current standards allow the UE to select a DRX cycle that is lower than the one currently being used, it may be noted that discussed methods in accordance with aspects of the present disclosure are equally applicable when a DRX cycle higher than the one currently being used is selected by the UE.

In certain aspects, smaller the value of the DRX cycle, larger is the UE power consumption, since a smaller DRX cycle means that the UE needs to wake up more frequently to listen to paging messages. In an aspect, when the determines that the contention percentage C over time T based on the default DRX cycles of the supported RATs is higher than the threshold contention percentage S, it checks the UE's remaining battery capacity B, and decides to initiate the new UE specific DRX cycle for one or more RATs only if the remaining battery capacity of the UE B is greater than a configurable threshold battery capacity M (e.g., B>M). M represents the minimum remaining battery capacity required by the UE to employ the new DRX cycle(s). This technique ensures that the UE has enough battery power to support a new shorter DRX cycles for the one or more RATs.

Further, in an aspect, after deciding to initiate a new DRX cycle for one or more supported RATs, the UE, before making a request for the new DRX cycle, determines a new RF resource contention percentage N over the time period T based on the new (to be requested) DRX cycle for the one or more RATs and default DRX cycles for the other RATs (e.g., if the UE decides not to change DRX cycles for all supported RATs). In an aspect, the UE decides to employ the new DRX cycle, only if the new contention percentage N based on the new DRX cycle is lower than the contention percentage C based on the current default DRX cycles (e.g., N<C). In an aspect, the UE requests for the new DRX cycle only if the new contention percentage N is below the current contention percentage C by a pre-configured amount. This way, the UE may ensure that the DRX cycle for the one or more RATs is changed to a lower, more power hungry DRX cycle, only if it benefits the UE.

In certain aspects, the UE may trigger the new DRX cycle(s) for one or more supported RATs by transmitting request(s) to eNB/MME via UE specific DRX attribute in TAU request or attach request messages. Once the network receives the request for the new DRX cycle(s), the MME may configure the requested UE specific DRX cycles and confirm usage of the UE specific DRX cycles by providing to the UE in NAS signaling as "UE specific DRX cycle" and to the eNB in PAGING S1 AP message as "Paging DRX" for MME initiated paging messages. In an aspect, UEs are configured to use the minimum of the default and UE specific DRX cycle. Thus, once the UE specific DRX cycle(s) is configured that is smaller than the default DRX cycle, the UE may use the UE specific DRX cycle for future receive activities.

In certain aspects, the UE may be configured to fallback to the default DRX cycles for one or more supported RATs if a set of conditions is met, for example to save power. In an aspect, the UE stores the default DRX cycle being used before employing the new UE specific DRX cycle(s) for one or more RATs in the UE's internal storage, for example, before requesting the new DRX cycle(s). Whenever the UE decides to fallback to the default DRX cycle, the UE may request the network for the DRX cycle previously stored in its memory via the TAU request or attach request messages.

In an aspect, the UE may be configured to periodically check for a set of conditions, and fallback to the default DRX cycles if one or more conditions are met. For example, the UE starts a fallback timer once it employs the new DRX cycle. In an aspect the UE falls back to the default DRX cycles for one or more RATs upon expiration of the fallback timer.

In certain aspects, DRX cycles of one or more RATs may change after the new DRC cycle is employed for those RATs. For example, a RAT may perform cell selection and may move to another cell changing its DRX cycle. In an aspect, the contention percentage based on the changed DRX cycles for the RATs may be less than the threshold contention percentage S and/or the contention percentage based on the UE specific RATs being currently used for the RATs.

In an aspect, the UE determines the contention percentage over a subsequent time period based on the default DRX cycles for the supported RATs, for example, upon expiration of the fallback timer, and falls back to the default DRX cycles for the RATs if the contention percentage based on the default DRX cycles is lower than the contention percentage based on the currently used UE specific DRX cycles over the subsequent time period. If not, the UE may restart the fallback timer and continue using the UE specific DRX cycle. This UE behavior may be dynamically configured.

In an aspect, the UE determines the contention percentage over a subsequent time period based on the default DRX cycles for the supported RATs, for example, upon expiration of the fallback timer, and falls back to the default DRX cycles for the RATs if the contention percentage based on the default DRX cycles is lower than the contention percentage threshold S.

In certain aspects, the UE periodically (e.g., based on a timer) determines the contention percentage based on the default DRX cycles for the supported RATs over a subsequent period of time and compares the determined contention percentage with the threshold contention percentage S. If the determined contention percentage based on the default DRX cycles is greater than S, the UE decides to initiate another update to DRX cycles of one or more RATs and calculates a new contention percentage based on the updated UE specific DRX cycles of the one or more RATs and default DRX cycles for other RATs. The UE decides to employ the updated DRX cycles if the new percentage is less than the percentage based on the default DRX cycles. Otherwise, the UE employs the default DRX cycles for the RATs or sticks to the default cycles if already employed. In an aspect, if the UE is not satisfied with the contention percentage based on the updated DRX cycles, it checks the contention percentage of the next available DRX cycle and switches to the next available DRX cycle if it satisfies the above criteria. In an aspect, the UE always checks if the remain battery capacity is above a threshold before employing any update to the DRX cycles.

Figure 8A:
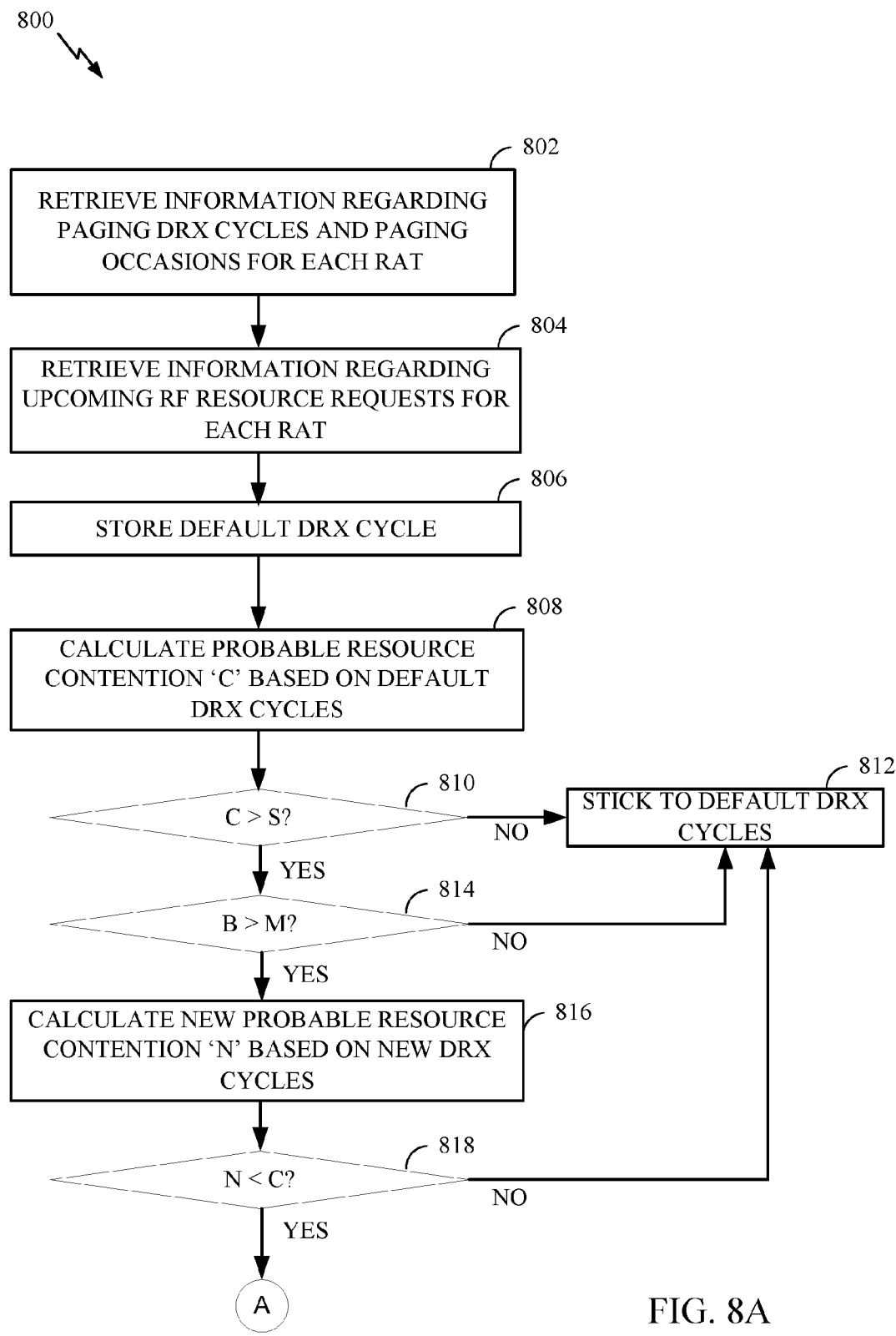
FIGS. 8A and 8B illustrate example operations 800 performed by a UE for reducing resource contentions between supported RATs, in accordance with certain aspects of the present disclosure.
Figure 8B:
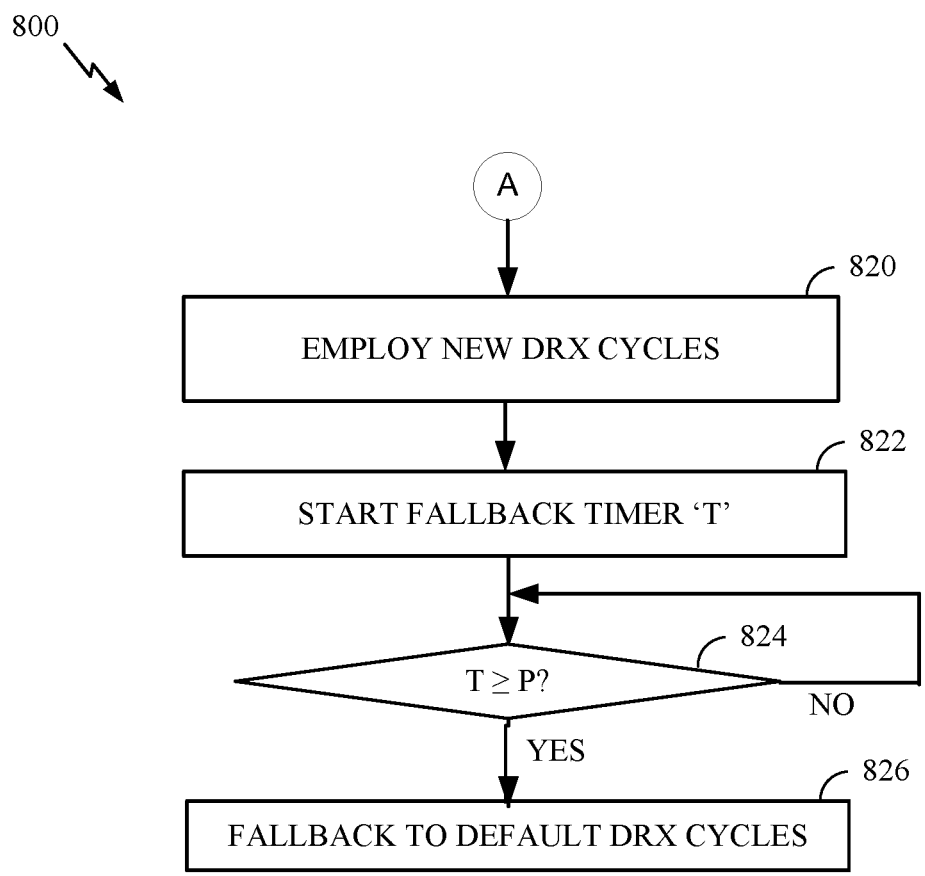

FIGS. 8A and 8B illustrate example operations 800 performed by a UE for reducing resource contentions between supported RATs, in accordance with certain aspects of the present disclosure. Operations 800 being, at 802, by the UE retrieving information regarding paging DRX cycles (or Default DRX cycles) and paging occasions for each of the RATs supported by the UE. At 804, the UE retrieves information regarding upcoming RF resource requests for each of the RATs, for example, from resource management modules of the RATs. As noted above, the UE may receive such information from the network, for example, as system information in SIB 2. Also, at least part of such information may be retrieved by an first protocol layer of the UE from another protocol layer of the UE. At 806, the UE stores the retrieved default DRX cycles in the UEs internal memory. In an aspect, the storing step may be performed at anytime before employing a new DRX cycle for one or more RATs. At 808, the UE calculates probable percentage RF resource contention 'C' between the supported RATs based on the default DRX cycles of the RATs. At 810 the UE checks if C is greater than a threshold percentage 'S' of the resource contention. If C is not greater than S, the UE, at 812, sticks to the default DRX cycles for the RATs. If C is greater than S, the UE, at 814, checks if a remaining battery capacity 'B' of the UE is greater than a threshold battery capacity 'M'. If B is not greater than M, the UE sticks to the Default DRX cycles (at 812). If the remaining battery capacity B is greater than the threshold M, the UE, at 816, the UE decides to initiate a new updated DRX cycle for one or more RATs and calculates a new probable resource contention 'N' between the RATs based on the next available DRX cycle for the one or more RATs.

At 818, the UE checks if N is less than the contention percentage C based on the default DRX cycles. If not, the UE sticks to the default DRX cycles (at 812). However, if the new contention percentage N based on the updated DRX cycles is greater than the contention percentage S based on the default DRX cycles, the UE, at 820 continued in FIG. 8A, employs the updated DRX cycle for the one or more RATs to recce the contention between the supported RATs. In an aspect, employing the updated DRX cycle includes requesting the updated DRX cycle by transmitting a request to the network via TAU request or attach request messages and receiving the updated DRX cycle from the network via a paging S1 message. At 822, the UE starts a fallback timer 'T'. At 824, the UE checks if the fall back timer T is greater than or equals a periodicity timer 'P'. If not, the UE continues checking if T≥P. On the other hand, if T≥P, the UE, at 826, falls back to the default values of the DRX cycles for the supported RATs.

It may be noted that while at least some of the discussion of the methods for reducing RF resource contention is based on receiving paging messages for the supported RATs, the discussion equally applies to RF resource contention for other types of receive activities as well. A person of ordinary skill in the art may easily apply the discussion based on RF resource contention between RATs while receiving paging messages to resource contentions between RATs while performing other types of receive activities noted in this disclosure.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications by a user equipment (UE), comprising:
    determining a first level of contention between Radio Frequency (RF) resources to be used by two or more Radio Access Technologies (RATs) supported by the UE based on assigned Discontinuous Reception (DRX) cycles for the RATs, wherein the level of contention is determined over a given period of time for performing at least one type of receive activity by the UE; and
    deciding to initiate, by the UE, a shorter DRX cycle for at least one of the RATs to reduce the contention, at least if the determined first level is greater than a given threshold level of the contention over the given period of time.

2. The method of claim 1, wherein deciding to initiate comprises:
    determining a second level of contention between the RF resources based at least on the shorter DRX cycle for the at least one RAT and the assigned DRX cycles of the other RATs, over the given period of time; and
    deciding to employ the shorter DRX cycle if the second level is less than the first level.

3. The method of claim 1, wherein deciding to initiate further comprises:
    deciding to initiate the shorter DRX cycle for the at least one RAT, if a remaining battery power of the UE is greater than a given threshold power.

4. The method of claim 1, further comprising:
    transmitting a request to initiate the shorter DRX cycle for the at least one RAT, based on the decision to initiate;
    receiving signaling confirming usage of the requested shorter DRX cycle; and
    employing the shorter DRX cycle in response to receiving the signaling.

5. The method of claim 4, further comprising:
    determining a second level of contention between RF resources to be used by the two or more RATs over a subsequent given period of time for performing the at least one type of receive activity, based at least on the shorter DRX cycle for the at least one RAT and the assigned DRX cycles of the other RATs; and deciding to fallback to the assigned DRX cycle for the at least one RAT, if the second level is higher than the first level.

6. The method of claim 4, further comprising deciding to fallback to the assigned DRX cycle for the at least one RAT upon at least one of expiration of the fallback timer started upon employing the shorter DRX cycle or lapsing of a period of time.

7. The method of claim 6, further comprising:
determining a second level of contention between RF resources to be used by the two or more RATs over a subsequent given period of time for performing the at least one type of receive activity, based at least on assigned DRX cycles for the RATs;
deciding to initiate, by the UE, another update of the DRX cycle for at least one of the RATs to reduce the contention, at least if the determined second level is greater than a given threshold level of the contention over the subsequent given period of time;
determining a third level of contention between the RF resources over the subsequent given period of time, based at least on the another updated DRX cycle for the at least one RAT and the assigned DRX cycles of the other RATs; and
deciding to employ the another updated DRX cycle for the at least one RAT, if the third level is less than the second level.

8. The method of claim 1, wherein determining the first level of contention comprises:
receiving at least information regarding the assigned DRX cycles of the other RATs and timing of the at least one type of receive activity for the other RATs; and
determining the first level of contention based on the received information.

9. The method of claim 8, wherein receiving at least information regarding the assigned DRX cycles of the other RATs and timing of the at least one type of receive activity for the other RATs includes receiving the at least information regarding the assigned DRX cycles of the other RATs and timing of the at least one type of receive activity for the other RATs at a first layer of the UE from a second layer of the UE.

10. The method of claim 1, wherein the at least one type of receive activity comprises at least one activity to be performed when the UE is in at least one of an idle mode or connected mode.

11. The method of claim 1, wherein the at least one RAT comprises Long Term Evolution (LTE).

12. An apparatus for wireless communications, comprising:
means for determining a first level of contention between Radio Frequency (RF) resources to be used by two or more Radio Access Technologies (RATs) supported by the apparatus based on assigned Discontinuous Reception (DRX) cycles for the RATs, wherein the level of contention is determined over a given period of time for performing at least one type of receive activity by the apparatus; and
means for deciding to initiate a shorter DRX cycle for at least one of the RATs to reduce the contention, at least if the determined first level is greater than a given threshold level of the contention over the given period of time.

13. The apparatus of claim 12, wherein the means for deciding to initiate is configured to:
determine a second level of contention between the RF resources based at least on the shorter DRX cycle for the at least one RAT and the assigned DRX cycles of the other RATs, over the given period of time; and
decide to employ the shorter DRX cycle if the second level is less than the first level.

14. The apparatus of claim 12, wherein the means for deciding to initiate is further configured to:
decide to initiate the shorter DRX cycle for the at least one RAT, if a remaining battery power of the apparatus is greater than a given threshold power.

15. The apparatus of claim 12, further comprising:
means for transmitting a request to initiate the shorter DRX cycle for the at least one RAT, based on the decision to initiate;
means for receiving signaling confirming usage of the requested shorter DRX cycle; and
means for employing the shorter DRX cycle in response to receiving the signaling.

16. The apparatus of claim 15, further comprising:
means for determining a second level of contention between RF resources to be used by the two or more RATs over a subsequent given period of time for performing the at least one type of receive activity, based at least on the shorter DRX cycle for the at least one RAT and the assigned DRX cycles of the other RATs; and
means for deciding to fallback to the assigned DRX cycle for the at least one RAT, if the second level is higher than the first level.

17. The apparatus of claim 15, further comprising means for deciding to fallback to the assigned DRX cycle for the at least one RAT upon at least one of expiration of the fallback timer started upon employing the shorter DRX cycle or lapsing of a period of time.

18. The apparatus of claim 17, further comprising:
means for determining a second level of contention between RF resources to be used by the two or more RATs over a subsequent given period of time for performing the at least one type of receive activity, based at least on assigned DRX cycles for the RATs;
means for deciding to initiate another update of the DRX cycle for at least one of the RATs to reduce the contention, at least if the determined second level is greater than a given threshold level of the contention over the subsequent given period of time;
means for determining a third level of contention between the RF resources over the subsequent given period of time, based at least on the another updated DRX cycle for the at least one RAT and the assigned DRX cycles of the other RATs; and
means for deciding to employ the another updated DRX cycle for the at least one RAT, if the third level is less than the second level.

19. An apparatus for wireless communications, comprising:
at least one processor configured to:
determine a first level of contention between Radio Frequency (RF) resources to be used by two or more Radio Access Technologies (RATs) supported by the apparatus based on assigned Discontinuous Reception (DRX) cycles for the RATs, wherein the level of contention is determined over a given period of time for performing at least one type of receive activity by the apparatus; and
decide to initiate shorter a DRX cycle for at least one of the RATs to reduce the contention, at least if the determined first level is greater than a given threshold level of the contention over the given period of time; and a memory coupled to the at least one processor.

20. The apparatus of claim 19, wherein the at least one processor is configured to:
    determine a second level of contention between the RF resources based at least on the shorter DRX cycle for the at least one RAT and the assigned DRX cycles of the other RATs, over the given period of time; and
    decide to employ the shorter DRX cycle if the second level is less than the first level.

21. The apparatus of claim 19, wherein the at least one processor is configured to:
    decide to initiate the shorter DRX cycle for the at least one RAT, if a remaining battery power of the apparatus is greater than a given threshold power.

22. The apparatus of claim 19, wherein the at least one processor is further configured to:
    transmit a request to initiate the shorter DRX cycle for the at least one RAT, based on the decision to initiate;
    receive signaling confirming usage of the requested shorter DRX cycle; and
    employ the shorter DRX cycle in response to receiving the signaling.

23. The apparatus of claim 22, wherein the at least one processor is further configured to:
    determine a second level of contention between RF resources to be used by the two or more RATs over a subsequent given period of time for performing the at least one type of receive activity, based at least on the shorter DRX cycle for the at least one RAT and the assigned DRX cycles of the other RATs; and
    decide to fallback to the assigned DRX cycle for the at least one RAT, if the second level is higher than the first level.

24. The apparatus of claim 22, wherein the at least one processor is further configured to decide to fallback to the assigned DRX cycle for the at least one RAT upon at least one of expiration of the fallback timer started upon employing the shorter DRX cycle or lapsing of a period of time.

25. A non-transitory computer readable medium for wireless communications by a user equipment (UE), comprising code which when executed by a computer performs a method comprising:
    determining a first level of contention between Radio Frequency (RF) resources to be used by two or more Radio Access Technologies (RATs) supported by the UE based on assigned Discontinuous Reception (DRX) cycles for the RATs, wherein the level of contention is determined over a given period of time for performing at least one type of receive activity by the UE; and
    deciding to initiate, by the UE, a shorter DRX cycle for at least one of the RATs to reduce the contention, at least if the determined first level is greater than a given threshold level of the contention over the given period of time.

26. The computer readable medium of claim 25, wherein deciding to initiate comprises:
    determining a second level of contention between the RF resources based at least on the shorter DRX cycle for the at least one RAT and the assigned DRX cycles of the other RATs, over the given period of time; and
    deciding to employ the shorter DRX cycle if the second level is less than the first level.

27. The computer readable medium of claim 25, wherein deciding to initiate further comprises:
    deciding to initiate the shorter DRX cycle for the at least one RAT, if a remaining battery power of the UE is greater than a given threshold power.

28. The computer readable medium of claim 25, further comprising code for:
    transmitting a request to initiate the shorter DRX cycle for the at least one RAT, based on the decision to initiate;
    receiving signaling confirming usage of the requested shorter DRX cycle; and
    employing the shorter DRX cycle in response to receiving the signaling.

29. The computer readable medium of claim 28, further comprising code for:
    determining a second level of contention between RF resources to be used by the two or more RATs over a subsequent given period of time for performing the at least one type of receive activity, based at least on the shorter DRX cycle for the at least one RAT and the assigned DRX cycles of the other RATs; and
    deciding to fallback to the assigned DRX cycle for the at least one RAT, if the second level is higher than the first level.

30. The computer readable medium of claim 28, further comprising code for deciding to fallback to the assigned DRX cycle for the at least one RAT upon at least one of expiration of the fallback timer started upon employing the shorter DRX cycle or lapsing of a period of time.

* * * * *